United States Patent
Graves et al.

(10) Patent No.: US 9,297,426 B2
(45) Date of Patent: Mar. 29, 2016

(54) POWER TAKE-OFF WITH REMOTELY MOUNTED CLUTCH ASSEMBLY AND LUBRICATED SPLINE

(75) Inventors: Damon B. Graves, Memphis, TN (US); John M. Loeffler, Olive Branch, MS (US); James E. Bohn, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 981 days.

(21) Appl. No.: 12/487,335

(22) Filed: Jun. 18, 2009

(65) Prior Publication Data
US 2009/0314108 A1      Dec. 24, 2009

Related U.S. Application Data

(60) Provisional application No. 61/073,465, filed on Jun. 18, 2008.

(51) Int. Cl.
*B60K 17/28*      (2006.01)
*F16D 25/0638*      (2006.01)
*F16D 1/10*      (2006.01)

(52) U.S. Cl.
CPC ............ *F16D 25/0638* (2013.01); *B60K 17/28* (2013.01); *F16D 1/10* (2013.01); *F16D 2001/103* (2013.01); *F16D 2300/06* (2013.01); *F16D 2300/26* (2013.01)

(58) Field of Classification Search
CPC ............................ B60K 17/28; F16D 25/0638
USPC ............. 74/15.6, 15.86, 11, 15.66, 15.8; 192/110 S, 85.24, 113.5, 85.61, 85.3, 192/85.31; 180/380
See application file for complete search history.

(56) References Cited

U.S. PATENT DOCUMENTS

| | | | | |
|---|---|---|---|---|
| 874,405 | A | * 12/1907 | Ide | 180/299 |
| 1,589,093 | A | * 6/1926 | Barrett | 74/15.86 |
| 2,579,382 | A | 12/1951 | Gattiker, Jr. et al. | |
| 2,584,965 | A | * 2/1952 | McFarland | 477/60 |
| 2,736,202 | A | * 2/1956 | Wagner | 74/15.86 |
| 2,907,428 | A | * 10/1959 | Erwin et al. | 192/48.4 |
| 2,908,351 | A | * 10/1959 | Daley, Jr. | 184/6.12 |
| 2,932,202 | A | * 4/1960 | Rinkema | 74/15.86 |
| 3,099,166 | A | * 7/1963 | Schou | 74/359 |
| 3,513,712 | A | 5/1970 | Zajichek et al. | |
| 3,540,297 | A | * 11/1970 | Wagner et al. | 74/15.86 |
| 3,848,691 | A | 11/1974 | Dolan | |
| 4,108,291 | A | 8/1978 | Zenker | |
| 4,275,607 | A | * 6/1981 | Snoy | 74/15.63 |
| 4,425,817 | A | 1/1984 | Wells et al. | |
| 4,445,876 | A | 5/1984 | Entrup | |
| 4,478,099 | A | 10/1984 | Hess et al. | |
| 4,542,801 | A | 9/1985 | Richards et al. | |
| 4,685,550 | A | 8/1987 | Metcalf | |

(Continued)

*Primary Examiner* — Robert Hodge
*Assistant Examiner* — Terry Chau
(74) *Attorney, Agent, or Firm* — MacMillan, Sobanski & Todd, LLC

(57) ABSTRACT

A power take-off includes an input mechanism that is disposed within an input mechanism housing and is adapted to be connected to a source of rotational energy. A clutch assembly is disposed within a driveshaft housing and is adapted to be connected to a rotatably driven accessory. A driveshaft connects the input mechanism to the clutch assembly. The driveshaft may be disposed within the driveshaft housing, which also forms a housing for the clutch assembly.

14 Claims, 4 Drawing Sheets

(56) References Cited

U.S. PATENT DOCUMENTS

| | | | |
|---|---|---|---|
| 4,773,277 A | 9/1988 | Cook et al. | |
| 4,960,344 A | 10/1990 | Geisthoff et al. | |
| 4,966,243 A | 10/1990 | Mirzakanien | |
| 5,143,477 A | 9/1992 | Kanehira et al. | |
| 5,215,161 A * | 6/1993 | Kobayashi | 180/248 |
| 5,542,306 A | 8/1996 | Fernandez | |
| 5,577,588 A * | 11/1996 | Raszkowski | 192/113.35 |
| 5,658,087 A | 8/1997 | Butkovich et al. | |
| 5,752,810 A * | 5/1998 | Hein | 417/319 |
| 6,021,876 A | 2/2000 | Bowden et al. | |
| 6,073,505 A | 6/2000 | Yuda | |
| 6,076,646 A * | 6/2000 | Burns | 192/85.02 |
| 6,199,653 B1 * | 3/2001 | Matsufuji et al. | 180/233 |
| 6,260,682 B1 | 7/2001 | Rang et al. | |
| 6,263,749 B1 | 7/2001 | Wesley | |
| 6,401,848 B1 | 6/2002 | Vu | |
| 6,478,132 B1 * | 11/2002 | Inaba | 192/219.4 |
| 6,499,548 B2 | 12/2002 | Wesley | |
| 6,830,142 B2 | 12/2004 | Weilant | |
| 6,854,541 B2 | 2/2005 | Matufuji et al. | |
| 7,093,434 B2 | 8/2006 | Shiozaki et al. | |
| 7,152,711 B2 | 12/2006 | Finocchio | |
| 2007/0209457 A1 | 9/2007 | Irikura et al. | |
| 2008/0098851 A1 | 5/2008 | Ishimaru et al. | |

* cited by examiner

POWER TAKE-OFF WITH REMOTELY MOUNTED CLUTCH ASSEMBLY AND LUBRICATED SPLINE

CROSS-REFERENCE TO RELATED APPLICATIONS

This application claims the benefit of U.S. Provisional Application No. 61/073,465, filed Jun. 18, 2008, the disclosure of which is incorporated herein by reference.

BACKGROUND OF THE INVENTION

This invention relates in general to power take-offs for selectively providing rotational energy from a source of rotational energy to a rotatably driven accessory. In particular, this invention relates to an improved structure for such a power take-off wherein an input mechanism and a clutch assembly of the power take-off are provided in separate housings that are spaced apart from one another. This invention also relates to a rotatable shaft that connects the input mechanism of the power take-off to the clutch mechanism, wherein the shaft has a passageway for supplying pressurized fluid from the input mechanism to the clutch mechanism.

A power take-off is a well known mechanical device that is often used in conjunction with a source of rotational energy, such as a vehicle engine or transmission, to provide rotational energy to a rotatably driven accessory. For example, power take-offs are commonly used in industrial and agricultural vehicles to provide rotational energy to hydraulic pumps that, in turn, operate hydraulically driven accessories such as plows, trash compactors, lifting mechanisms, winches, and the like. The power take-off provides a simple, inexpensive, and convenient means for supplying rotational energy from the source of rotational energy to the rotatably driven accessory.

A typical power take-off includes an input mechanism and an output mechanism. The input mechanism of the power take-off is adapted to be connected to the source of rotational energy so as rotatably driven whenever the source of rotational energy is operated. The output mechanism of the power take-off is adapted to be connected to the rotatably driven accessory. In some instances, the input mechanism of the power take-off is directly connected to the output mechanism such that the rotatably driven accessory is always rotatably driven whenever the source of rotational energy is operated. In other instances, a clutch assembly is provided between the input mechanism and the output mechanism such that the rotatably driven accessory is selectively driven only when the source of rotational energy is operated and the clutch assembly is engaged.

In both instances, the power take-off is usually mounted directly on the source of rotational energy (such as a housing of a transmission) and the rotatably driven accessory is, in turn, mounted directly on the power take-off. However, if the rotatably driven accessory is relatively large or heavy, it may be relatively difficult to mount the rotatably driven accessory directly on the power take-off. To address this, it is known to provide a rotatable shaft that extends between the power take-off and the rotatably driven accessory. This rotatable shaft allows the rotatably driven accessory to be positioned at a location that is remote from the power take-off, thereby facilitating more convenient installation or service.

Although a rotatably driven accessory that is remotely mounted from the power take-off has functioned satisfactorily in many circumstances, it has been found that the power take-off itself may, in some instances, be so relatively large or heavy as to make it relatively difficult to mount the power take-off on the source of rotational energy. Thus, it would be desirable to provide an improved structure for a power take-off that would facilitate the installation of the power take-off on the source of rotational energy in these circumstances.

SUMMARY OF THE INVENTION

This invention relates to an improved structure for a power take-off having an input mechanism and a clutch assembly that are provided in separate housings that are spaced apart from one another. A rotatable shaft connects the input mechanism of the power take-off to the clutch assembly. The shaft has a passageway for supplying pressurized fluid from the input assembly to an actuating mechanism for the clutch assembly and to an output shaft of the clutch assembly.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
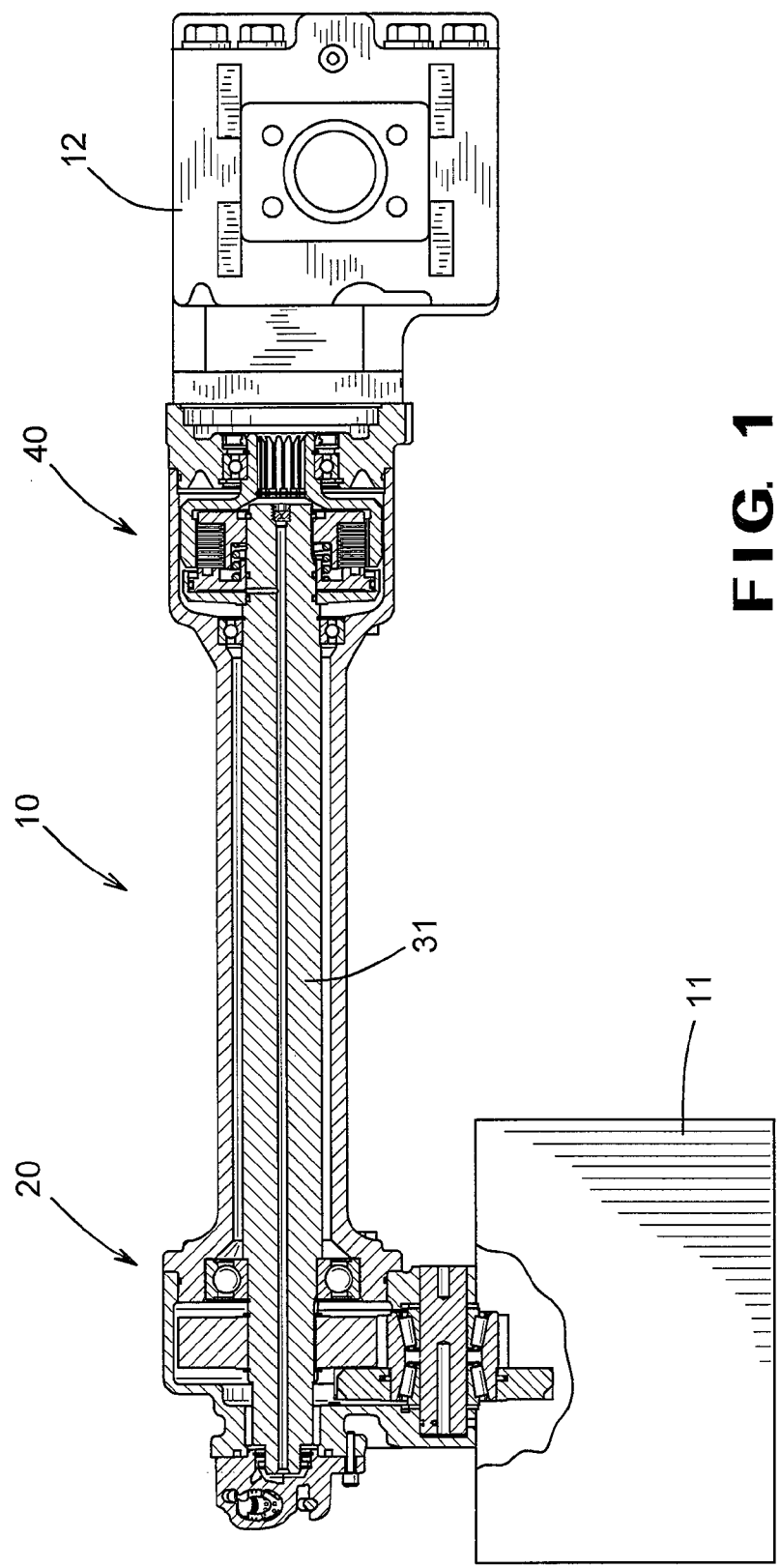
FIG. 1 is a sectional elevational view of a power take-off in accordance with this invention shown connected between a source of rotational energy and a rotatably driven accessory.
Figure 2:
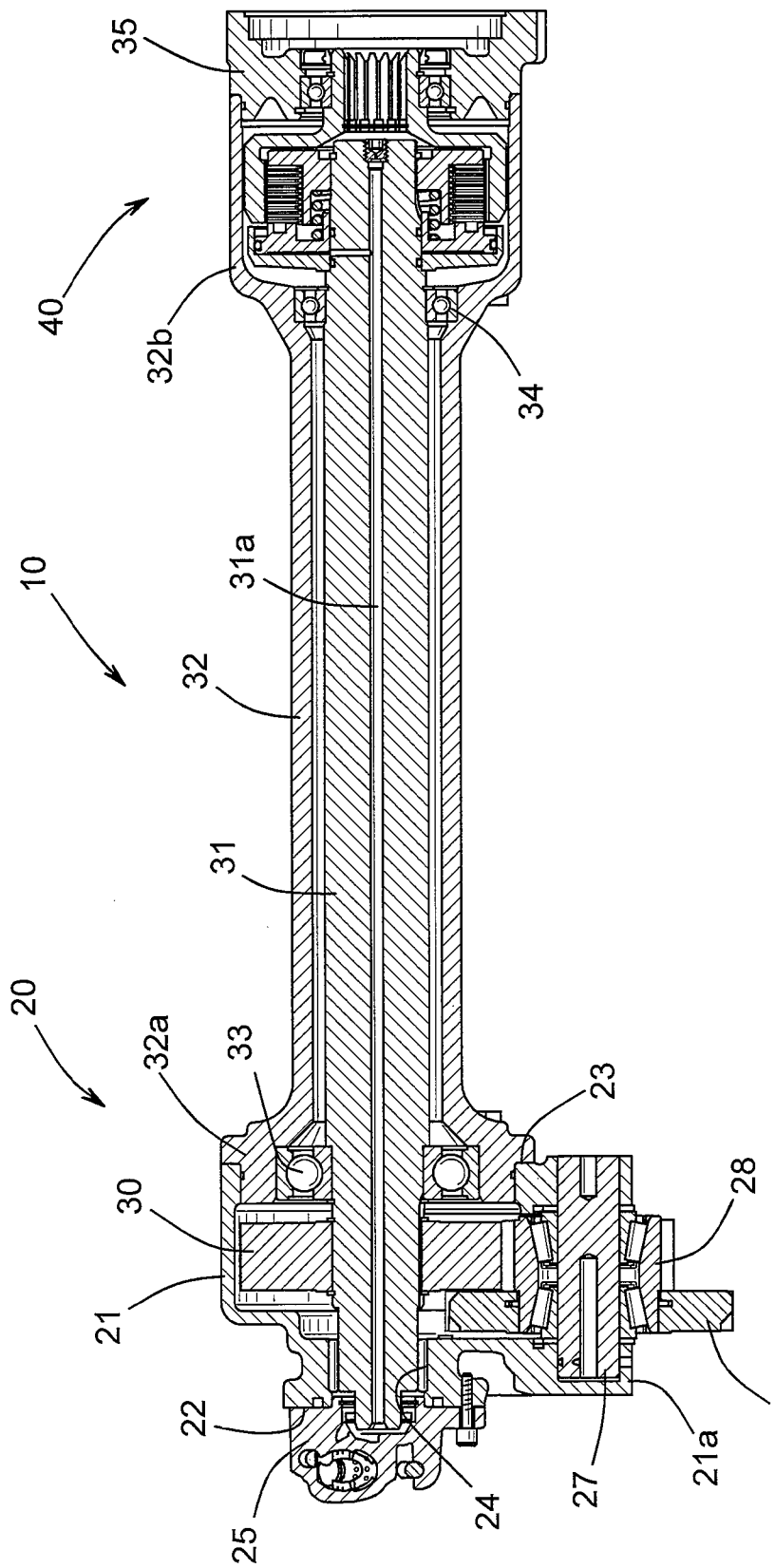
FIG. 2 is an enlarged sectional elevational view of the power take-off illustrated in FIG. 1 showing an input mechanism and a clutch assembly.

Referring now to the drawings, there is illustrated in FIGS. 1 and 2 a power take-off, indicated generally at 10, in accordance with this invention. The illustrated power take-off 10 is intended to be representative of any structure for selectively providing rotational energy from a source of rotational energy 11 (such as a transmission of a vehicle) to a rotatably driven accessory 12 (such as a hydraulic pump that is supported on the vehicle). Thus, the scope of this invention is not intended to be limited for use with the specific structure for the power take-off 10 illustrated in FIGS. 1 and 2.

Figure 3:
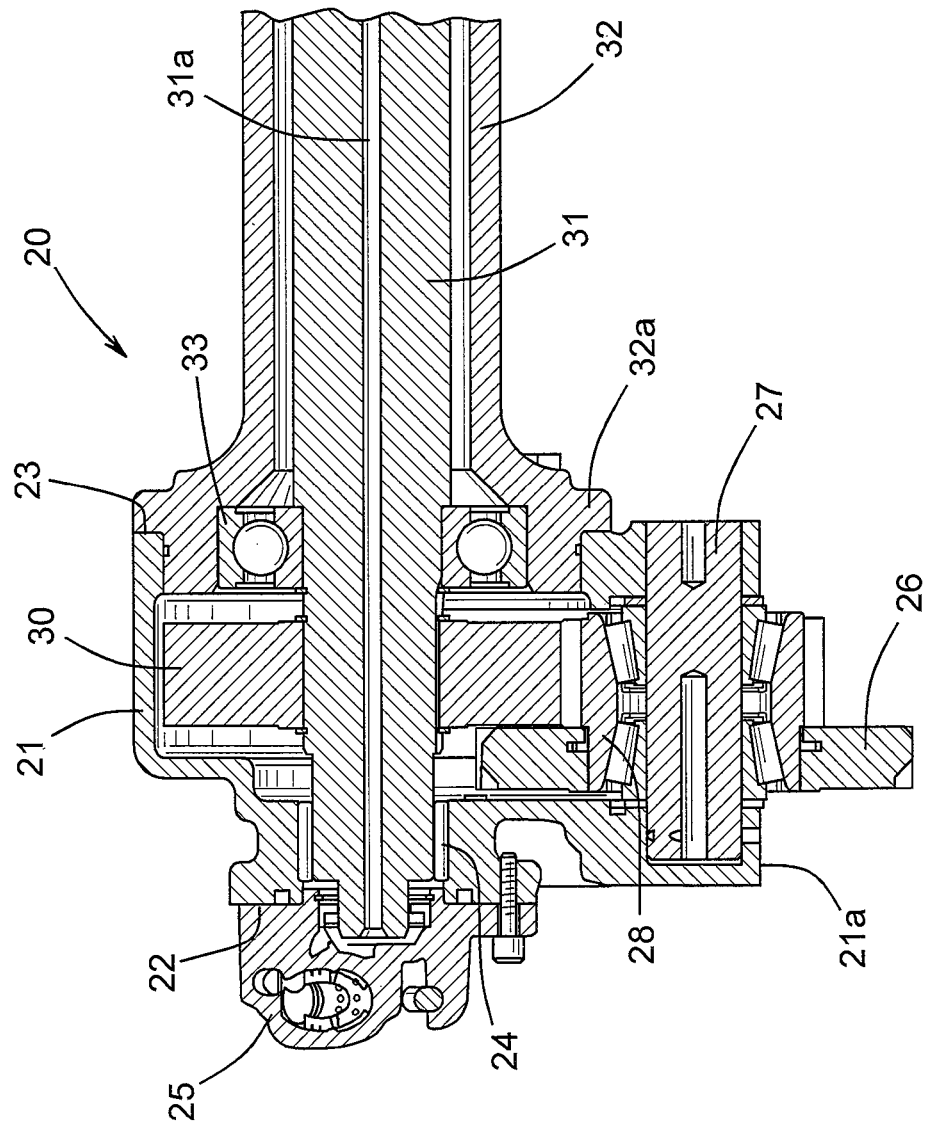
FIG. 3 is a further enlarged sectional view of the input mechanism of the power take-off illustrated in FIGS. 1 and 2.

As best shown in FIGS. 2 and 3, the power take-off 10 includes an input mechanism, indicated generally at 20. The input mechanism 20 of the power take-off 10 is adapted to be connected to the source of rotational energy 11 in a known manner so as rotatably driven whenever the source of rotational energy 11 is operated. The illustrated input mechanism 20 includes an input mechanism housing 21 that is generally hollow and cylindrical in shape. The input mechanism housing 21 has a mounting surface 21a that is provided to facilitate the attachment of the power take-off 10 to the source of rotational energy 11 as described below.

The input mechanism housing 21 includes a first opened end 22 (the left end when viewing the drawings) and a second opened end 23 (the right end when viewing the drawings). The first opened end 22 of the input mechanism housing 21 has a first bearing 24 provided therein. In the illustrated embodiment, the first bearing 24 is embodied as a plurality of conventional roller bearings that are arranged in an annular array within the first opened end 22 of the input mechanism housing 21. However, the first bearing 24 may be embodied as any other conventional bearing structure. The first opened end 22 of the input mechanism housing 21 is closed by a conventional hydraulic port assembly 25 that is secured thereto in any conventional manner. The purposes for the first bearing 24 and the hydraulic port assembly 25 will be explained below.

The input mechanism housing 21 further includes an input gear assembly 26 having a portion that extends outwardly from the input mechanism housing 21 and is adapted is adapted to be connected to the source of rotational energy 11 so as to be rotatably driven thereby in a conventional manner. The input gear assembly 26 is supported by a conventional tapered roller bearing assembly 28 or other conventional means for rotation on a non-rotatable idler shaft 27 contained within the input mechanism housing 21. Thus, the input gear assembly 26 is rotatably driven whenever the source of rotational energy 11 is operated.

The input gear assembly 26 rotatably drives a drive gear 30 that is disposed within the input mechanism housing 21. The drive gear 30 is supported on a driveshaft 31 for rotation therewith. In the illustrated embodiment, the drive gear 30 is splined onto the driveshaft 31. However, the drive gear 30 may be otherwise secured to (or, alternatively, formed integrally with) the driveshaft 31 in any desired manner. Thus, whenever the drive gear 30 is rotated by the source of rotational energy 11, the drive gear 30 and the driveshaft 31 are also rotated. It will be appreciated that the input mechanism 20 may be embodied as any desired structure other than as specifically described and illustrated that is capable of performing this function.

The driveshaft 31 has a first passageway 31a formed therethrough. A first end of the first passageway 31a is disposed adjacent to and communicates with the hydraulic port assembly 25. In the illustrated embodiment, the first passageway 31a extends co-axially through the driveshaft 31, although such is not required. The purpose for this first passageway 31a will be explained below.

The driveshaft 31 is supported for rotation within a driveshaft housing 32 having first end 32a and a second end 32b. The first end 32a of the driveshaft housing 32 is secured to the second opened end 23 of the input mechanism housing 21. A bearing 33 or other conventional structure is supported within the first end 32a of the driveshaft housing 32 and rotatably supports a first end of the driveshaft 31 therein. Similarly, a bearing 34 or other conventional structure is supported within the second end 32b of the driveshaft housing 32 and rotatably supports a second end of the driveshaft 31 therein. The illustrated second end 32b of the driveshaft housing 32 includes an extended hollow cylindrical portion, although such is not required. A mounting flange 35 is secured to the extended hollow cylindrical portion of the second end 32b of the driveshaft housing 32. A bearing 36 or other conventional structure is supported within the mounting flange 35. The mounting flange 35 is connected to the rotatably driven accessory 12 in a known manner, although such is not required. In the illustrated embodiment, a metering valve 37 is provided in the second end of the passageway 31a. The purposes for the bearing 36 and the metering valve 37 will be explained below.

A clutch assembly, indicated generally at 40, is provided for selectively connecting the second end of the driveshaft 31 to the rotatably driven accessory 12. In a manner that will be explained below, the clutch assembly 40 is adapted to selectively connect the second end of the driveshaft 31 to the rotatably driven accessory 12 such that the rotatably driven accessory 12 is rotatably driven whenever the source of rotational energy 11 is operated and the clutch assembly 40 is engaged. It will be appreciated that the clutch assembly 40 may be embodied as any desired structure other than as specifically described and illustrated that is capable of performing this function. The illustrated clutch assembly 40 is disposed within the extended hollow cylindrical portion of the second end 32b of the driveshaft housing 32, although such is not required.

The clutch assembly 40 includes an input member 41 that is splined or otherwise connected to the driveshaft 31 for rotation therewith. A first plurality of flat, annular clutch plates 42 is splined or otherwise connected to the input member 41 for rotation therewith. Thus, the driveshaft 31, the input member 41, and the first plurality of clutch plates 42 all rotate as a unit. The clutch assembly 40 also includes an output member, indicated generally at 43. In the illustrated embodiment, the output member 43 includes a hollow cylindrical portion 43a and an output shaft portion 43b. The hollow cylindrical portion 43a of the output member 43 is disposed about the driveshaft 31 and the input member 41. A second plurality of flat, annular clutch plates 44 is splined or otherwise connected to the hollow cylindrical portion 43a of the output member 43 for rotation therewith. Thus, the output member 43 and the second plurality of clutch plates 43 all rotate as a unit. Preferably, the second plurality of clutch plates 44 is interleaved in an alternating manner with the first plurality of clutch plates 42 to form a conventional clutch pack, although such is not required. A second end of the passageway 31a is disposed adjacent to and communicates with the output shaft portion 43b of the output member 43. The purpose for this will also be explained below.

The output shaft portion 43b of the output member 43 extends from the hollow cylindrical portion 43a and is received within the bearing 36 that, as mentioned above, is supported in the mounting flange 35. As a result, the output member 43 is supported for rotation in the second end 32b of the driveshaft housing 32 and the mounting flange 35. The output shaft portion 43b is adapted to be connected to an input shaft (not shown) of the rotatably driven accessory 12 in any desired manner.

An actuating mechanism is provided for selectively operating the clutch assembly 40 in either a disengaged mode, wherein the input member 41 is not connected to rotatably drive the output member 43, and an engaged mode, wherein the input member 41 is connected to rotatably drive the output member 43. In the illustrated embodiment, the actuating mechanism of the clutch assembly 40 includes a cylinder 45 that defines a chamber 45a. An actuating piston 46 is disposed within the chamber 45a and is supported for movement relative to the cylinder 45. In the illustrated embodiment, the actuating piston 46 is supported for axial movement between a disengaged position (toward the left when viewing FIG. 4) and an engaged position (toward the right when viewing FIG. 4). A spring 47 or other conventional biasing mechanism may be provided for urging the actuating piston 46 toward the disengaged position.

A second passageway 31b is provided in the driveshaft 31 and provides communication between the first passageway 31a and the chamber 45a of the cylinder 45. In the illustrated embodiment, the second passageway 31b extends radially outwardly from the first passageway 31a, although such is not required. As will be explained in greater detail below, pressurized fluid can be selectively provided from a source (not shown) through the hydraulic port assembly 25 and the first and second passageways 31a and 31b to the chamber 45b so as to cause the actuating piston 46 to move from the disengaged position to the engaged position against the urging of the spring 47.

The installation of the power take-off 10 will now be described. Initially, the input mechanism 20 of the power take-off 10 is installed on the source of rotational power 11. To accomplish this, the input mechanism housing 21, including only the hydraulic port assembly 25 and the input gear assembly 26, is secured to the source of rotational power 11 such that the input gear assembly 26 extends within and is rotatably driven by the source of rotational energy 11. Because it is relatively small and lightweight, this initial installation of the input mechanism 20 of the power take-off 10 on the source of rotational power 11 can be accomplished relatively easily.

Thereafter, the driveshaft 31 (including the drive gear 30) and the driveshaft housing 32 (including the bearing 33, the bearing 34 and the clutch assembly 40) are installed on the input mechanism 20. The modular nature of this assembly not only facilitates the installation thereof on the input mechanism 20, but also facilitates the custom manufacture of the driveshaft 31 and the driveshaft housing 32 having different lengths. By providing the different modules of the driveshaft 31 and the driveshaft housing 32 having different lengths, the position of the clutch assembly 40 relative to the input gear assembly 20 can be varied quickly and easily. Lastly, the rotatably driven accessory 12 is installed on the mounting flange 35.

Figure 4:
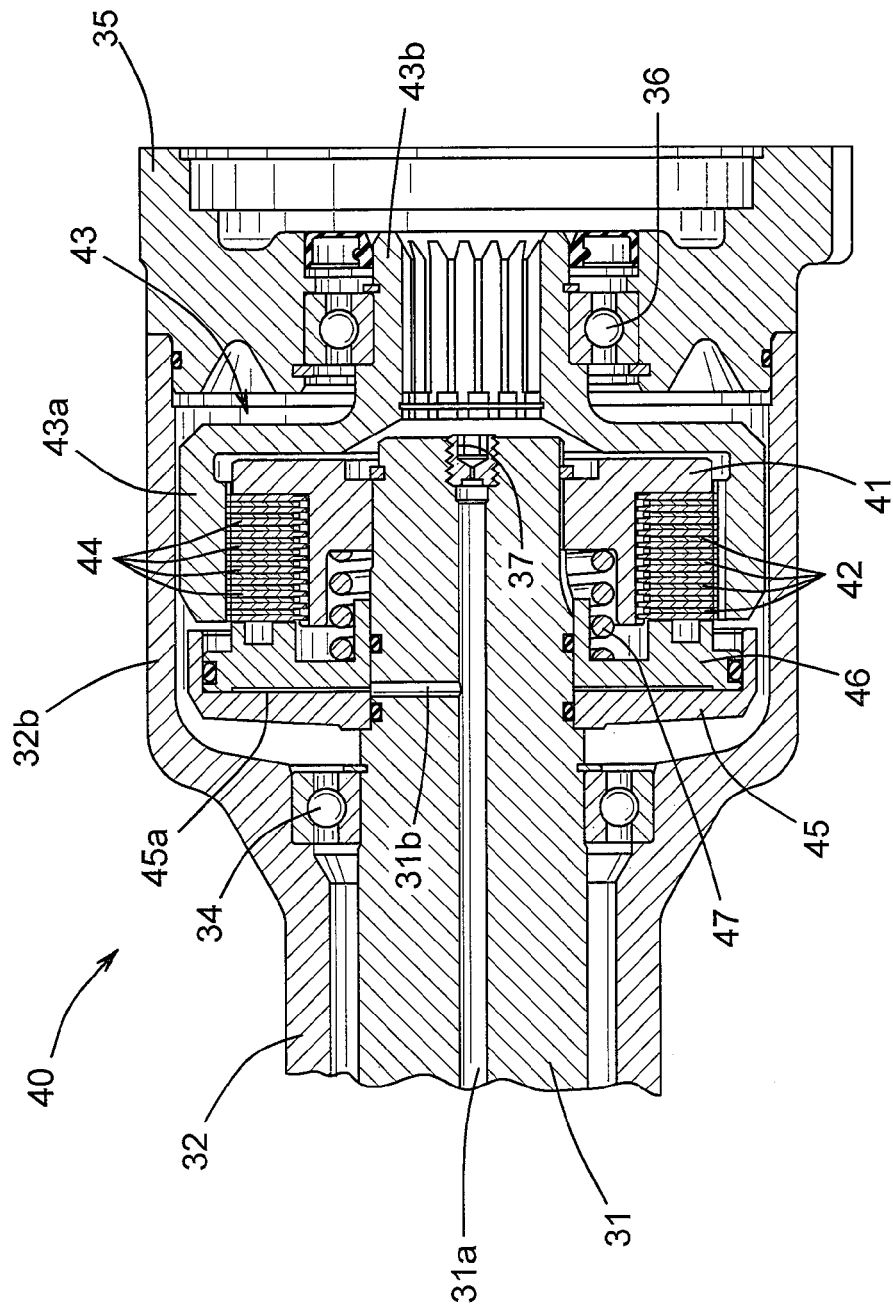
FIG. 4 is a further enlarged sectional view of the clutch assembly of the power take-off illustrated in FIGS. 1 and 2.

In operation, the clutch assembly 40 of the power take-off 10 is initially in the disengaged mode illustrated in FIG. 4. This occurs because of the urging of the coiled spring 47 that, as discussed above, urges the actuating piston 46 axially toward the disengaged position (toward the left when viewing FIG. 4). Because of this, the first and second pluralities of clutch plates 42 and 44 do not frictionally engage one another. Consequently, no rotational power is transmitted from the driveshaft 31 through the clutch assembly 40 to the rotatably driven accessory 12. Thus, in this disengaged mode, the driveshaft 31 is not connected to rotatably drive the output member 43 when the source of rotational power 11 is operated.

Thereafter, to operate the clutch assembly 40 in the engaged mode, pressurized fluid is provided through the hydraulic port assembly 25 to the first passageway 31a formed through the driveshaft 31. This pressurized fluid, which can be supplied from a conventional selectively controlled source of pressurized fluid (not shown), is supplied through the second passageway 31b formed through the driveshaft 31 to the chamber 45a of the cylinder 45. As a result, the actuating piston 45 is moved from the disengaged position to the engaged position, thereby causing the first and second pluralities of clutch plates 42 and 44 to frictionally engage one another. Consequently, rotational power is transmitted from the driveshaft 31 through the clutch assembly 40 to the rotatably driven accessory 12. Thus, in this engaged mode, the driveshaft 31 is connected to rotatably drive the output member 43 when the source of rotational power 11 is operated.

At the same time, a relatively small amount of the pressurized fluid is passed from the first passageway 31a through the metering valve 37 into the vicinity of the output shaft portion 43b of the output member. As mentioned above, the output shaft portion 43b is adapted to be connected to an input shaft (not shown) of the rotatably driven accessory 12. By supplying a relatively small amount of the pressurized fluid as a lubricant to the region where the output shaft portion 43b is connected to the input shaft of the rotatably driven accessory 12, undesirable wear between such components can be minimized.

In the illustrated embodiment, the input mechanism housing 21 and the driveshaft housing 31 are formed from separate pieces of material. However, the input mechanism housing 21 and the driveshaft housing 31 may be formed a single piece of material if desired. Also, in the illustrated embodiment, both of the first and second ends 32a and 32b of the driveshaft housing 32 are enlarged in dimension relative to an intermediate portion thereof. However, the first and second ends 32a and 32b of the driveshaft housing 32 may have any desired shapes or sizes relative to the intermediate portion thereof. Similarly, in the illustrated embodiment, both of the input mechanism housing 21 and the extended hollow cylindrical portion of the second end 32b of the driveshaft housing 32 (which functions as a housing for the clutch assembly 40) are enlarged in dimension relative to the intermediate portion of the driveshaft housing 32. However, the input mechanism housing 21 and the extended hollow cylindrical portion of the second end 32b of the driveshaft housing 32 may have any desired shapes or sizes relative to the intermediate portion thereof.

In accordance with the provisions of the patent statues, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power take-off adapted to be used in conjunction with a vehicle drive train, the power take-off comprising:
    an input mechanism housing including a hydraulic port assembly adapted to communicate with a source of pressurized fluid, a mounting surface adapted to be attached to a source of rotational energy, and an opening extending through the mounting surface;
    an input gear assembly rotatably supported within the input mechanism housing and having a portion that extends through the opening and is adapted to be rotatably driven by the source of rotational energy;
    a driveshaft housing having a first end that is secured to the input mechanism housing and a second end;
    a driveshaft rotatably driven by the input gear assembly and extending through the driveshaft housing to the second end thereof, the driveshaft including a passageway that communicates with the hydraulic port assembly; and
    a clutch assembly supported within the second end of the driveshaft housing and including an actuating mechanism that communicates with the passageway and an output member adapted to be connected to a rotatably driven accessory, wherein the actuating mechanism is responsive to pressurized fluid from the source of pressurized fluid for selectively connecting the driveshaft to the output member and thereby allowing the source of rotational energy to rotatably drive the rotatably driven accessory.

2. The power take-off defined in claim 1 wherein the driveshaft housing is formed from a single piece of material.

3. The power take-off defined in claim 1 wherein the driveshaft housing has an intermediate portion that extends between the first and second ends, and wherein the first end of the driveshaft housing is enlarged in dimension relative to the intermediate portion thereof.

4. The power take-off defined in claim 1 wherein the driveshaft housing has an intermediate portion that extends between the first and second ends, and wherein the second end of the driveshaft housing is enlarged in dimension relative to the intermediate portion thereof.

5. The power take-off defined in claim 1 wherein the driveshaft housing has an intermediate portion that extends between the first and second ends, and wherein both of the first and second ends of the driveshaft housing are enlarged in dimension relative to the intermediate portion thereof.

6. The power take-off defined in claim 1 wherein the passageway includes a portion that communicates with the output member.

7. The power take-off defined in claim 6 further including a metering valve provided in the portion of the passageway that communicates with the output member.

8. An assembly comprising:
   a source of rotational energy adapted to be a component of a vehicle drive train;
   a rotatably driven accessory; and
   a power take-off including:
      an input mechanism housing including a hydraulic port assembly adapted to communicate with a source of pressurized fluid, a mounting surface adapted to be attached to the source of rotational energy, and an opening extending through the mounting surface;
      an input gear assembly rotatably supported within the input mechanism housing and having a portion that extends through the opening and is rotatably driven by the source of rotational energy;
      a driveshaft housing having a first end that is secured to the input mechanism housing and a second end;
      a driveshaft rotatably driven by the input gear assembly and extending through the driveshaft housing to the second end thereof, the driveshaft including a passageway that communicates with the hydraulic port assembly; and
      a clutch assembly supported within the second end of the driveshaft housing and including an actuating mechanism that communicates with the passageway and an output member connected to the rotatably driven accessory, wherein the actuating mechanism is responsive to pressurized fluid from the source of pressurized fluid for selectively connecting the driveshaft to the output member and thereby allowing the source of rotational energy to rotatably drive the rotatably driven accessory.

9. The assembly defined in claim 8 wherein the driveshaft housing is formed from a single piece of material.

10. The assembly defined in claim 8 wherein the driveshaft housing has an intermediate portion that extends between the first and second ends, and wherein the first end of the driveshaft housing is enlarged in dimension relative to the intermediate portion thereof.

11. The assembly defined in claim 8 wherein the driveshaft housing has an intermediate portion that extends between the first and second ends, and wherein the second end of the driveshaft housing is enlarged in dimension relative to the intermediate portion thereof.

12. The assembly defined in claim 8 wherein the driveshaft housing has an intermediate portion that extends between the first and second ends, and wherein both of the first and second ends of the driveshaft housing are enlarged in dimension relative to the intermediate portion thereof.

13. The assembly defined in claim 8 wherein the passageway includes a portion that communicates with the output member.

14. The assembly defined in claim 13 further including a metering valve provided in the portion of the passageway that communicates with the output member.

\* \* \* \* \*